United States Patent [19]

Krakauer

[11] 3,940,016

[45] Feb. 24, 1976

[54] ARTICLE VENDING APPARATUS WITH DOOR INTERLOCK

[76] Inventor: Merrill Krakauer, One Deer Path, Short Hills, N.J. 07078

[22] Filed: July 25, 1974

[21] Appl. No.: 491,828

[52] U.S. Cl. .............................................. 221/129
[51] Int. Cl.$^2$ .............................................. B65G 33/04
[58] Field of Search ............. 221/76, 81, 89, 90, 79, 221/75, 125–129; 194/2, 10

[56] References Cited

UNITED STATES PATENTS

| | | | |
|---|---|---|---|
| 2,289,807 | 7/1942 | Schaevitz et al. | 221/129 X |
| 2,923,392 | 2/1960 | Gabrielsen | 221/129 X |
| 2,978,085 | 4/1961 | Stayton et al. | 194/10 |
| 3,164,294 | 1/1965 | Phillips et al. | 221/129 X |

*Primary Examiner*—Stanley H. Tollberg
*Attorney, Agent, or Firm*—Emory L. Groff, Jr.

[57] ABSTRACT

A vending apparatus for packaged articles includes a cabinet having a plurality of windows each having a delivery compartment aligned with a multi-package storage compartment. Motor driven feeder means disposed adjacent each storage compartment carries a variable number of divider elements to contain, advance and sequentially discharge single articles from the storage compartment to the delivery compartment. A plurality of switches sense and regulate the opening and closing of any one of the doors, the activation of the associated feeder means and the presence or absence of articles in the storage compartment while a shiftable gate assembly activated by operation of each door prevents access to articles within the storage compartment. By a modification the forwardmost article may be retained for display either in the front of the storage compartment or within the delivery compartment.

21 Claims, 8 Drawing Figures

ARTICLE VENDING APPARATUS WITH DOOR INTERLOCK

This invention relates generally, to vending machines and more particularly, to an improved apparatus intended to offer for vending, packaged articles as contained within a plurality of compartments. The packaged articles may be of various sizes and each compartment includes an individual delivery door operable upon insertion of the proper coin(s) to initiate a switch-controlled feeder assembly permitting removal of the forwardmost packaged article behind the door and causing advancement of all articles contained within that storage compartment.

The feeder assembly as employed in the present invention is an advancement over prior known feeder devices of the helical type such as shown in the patents to Krakauer et al., U.S. Pat. No. 3,269,595 issued Aug. 30, 1966 and U.S. Pat. No. 3,344,593 issued Oct. 3, 1967. A disadvantage of feeder assemblies according to these patents is that the size and shape of the packaged articles utilized therewith is significantly restricted since the package must be disposed between adjacent convolutions of a helical feeding member. By the present arrangement various sizes of packaged articles may be simultaneously stored, retained, advanced and sequentially discharged from a single compartment by means of a single feeder assembly. This is achieved without the need for any special tools or time consuming modification when stocking the vending apparatus with articles of varying dimensions.

Combined with the feeder assembly of the present invention are separate storage and delivery compartments forming an independent cell behind each one of the plurality of individual delivery doors and resulting in a minimum disturbance to each packaged article during operation of the apparatus. This feature is readily appreciated when considering that often the packaged articles may include commodities requiring delicate handling and which, if permitted to drop to a central discharge point in the lower portion of the apparatus, would become crushed or otherwise damaged prior to final receipt by the customer.

Accordingly, one of the primary objects of the present invention is to provide an improved vending apparatus including a plurality of storage-delivery cells each provided with an access door disposed adjacent longitudinally aligned delivery and storage compartments and having a motor driven feeder assembly for sequentially advancing single packaged articles from the storage compartment to the delivery compartment.

Another object of the present invention is to provide an improved vending apparatus including a storage compartment for packaged articles adapted to be sequentially retained and advanced by motor driven feeder means to an adjacent delivery compartment in response to a plurality of switch means responsive to the presence or absence of an article within the delivery compartment.

Still another object of the present invention is to provide an improved vending apparatus including longitudinally adjacent storage and delivery compartments having an access door, the actuation of which initiates switch means operating motor driven feeder means regulating the advancement and discharge of single packaged articles from the storage compartment to the delivery compartment.

With these and other objects in view which will more readily appear as the nature of the invention is better understood, the invention consists in the novel construction, combination and arrangement of parts hereinafter more fully described, illustrated and claimed.

Preferred and practical embodiments of the invention are shown in the accompanying drawings in which.

Similar reference characters designate corresponding parts throughout the several figures of the drawings.

Figure 1:
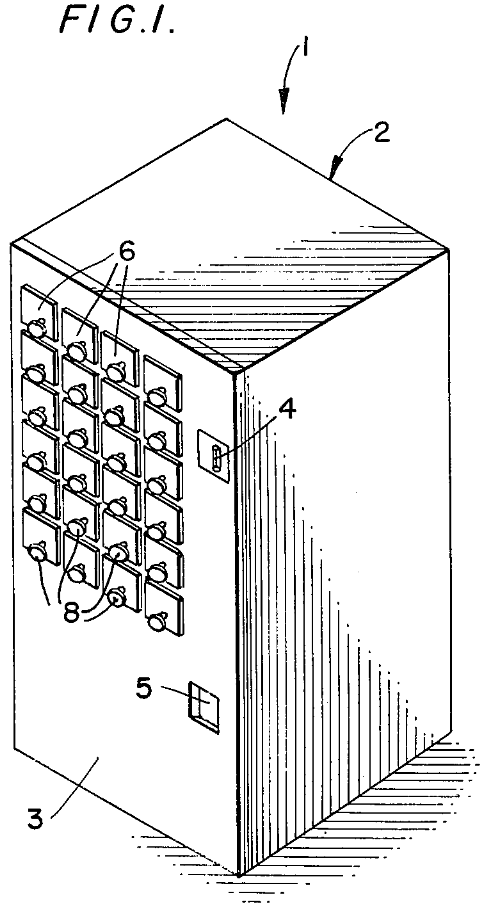
FIG. 1 is a perspective view of an article vending apparatus according to the present invention.

Referring to the drawings, particularly FIG. 1, the present invention will be seen to comprise a vending apparatus, generally designated 1, and comprising a cabinet or housing 2 provided with a front-mounted service door 3 supporting the usual coin receiving slot 4 and appropriate coin return 5. The cabinet 2 may be suitably insulated (not shown) in order to accommodate packaged articles intended to be retained in either a heated or refrigerated condition as is well known in the art. Mounted upon the service door 3 are a plurality of vertically and horizontally aligned individual delivery or access doors or windows 6, each suitably attached to the door such as by the spring loaded hinge 7 (FIG. 4) which normally biases each door 6 to the closed position and which are manually displaceable about the hinged pivot by means of a suitable knob 8.

Located behind each door or window 6 and disposed fully within the confines of the cabinet 2 is a storage-delivery cell, generally designated 9, and which includes in the rear thereof an article storage compartment 10 and an article delivery compartment 11 disposed intermediate the forward edge 12 of the storage compartment shelf 13 and the inner surface of the door or window 6.

For purposes of understanding the construction and operation of the present invention, the description herein of one of the cells 9 will be understood to apply to each one of the plurality of cells. Additionally, although individual drive or motor means are illustrated as provided for each cell it will be appreciated that a common drive member may be used together with appropriate power transmission means to selectively serve each of the cells.

The lateral limits of each storage-delivery cell 9 are defined by the parallel sidewalls 14 disposed normal to the coextensive rear wall 15. The vertical limits of each cell 9 are defined by the storage shelf 13 and the delivery shelf 16 with the latter pivotally mounted in a plane slightly below that of the storage shelf 13 and longitudinally spaced therefrom a nominal distance to provide a clearance 17 as shown in FIG. 2 between the forward edge 12 of the storage shelf 13 and the rear edge 18 of the delivery shelf 16.

Although the storage shelves 13 are illustrated as being disposed in a horizontal plane, it will be quite obvious that these shelves may be inclined downwardly from the rear wall 15 to the forward edge 12 should it be deemed desirable to increase the viewability of packaged articles A disposed within the storage compartment 10.

Figure 2:
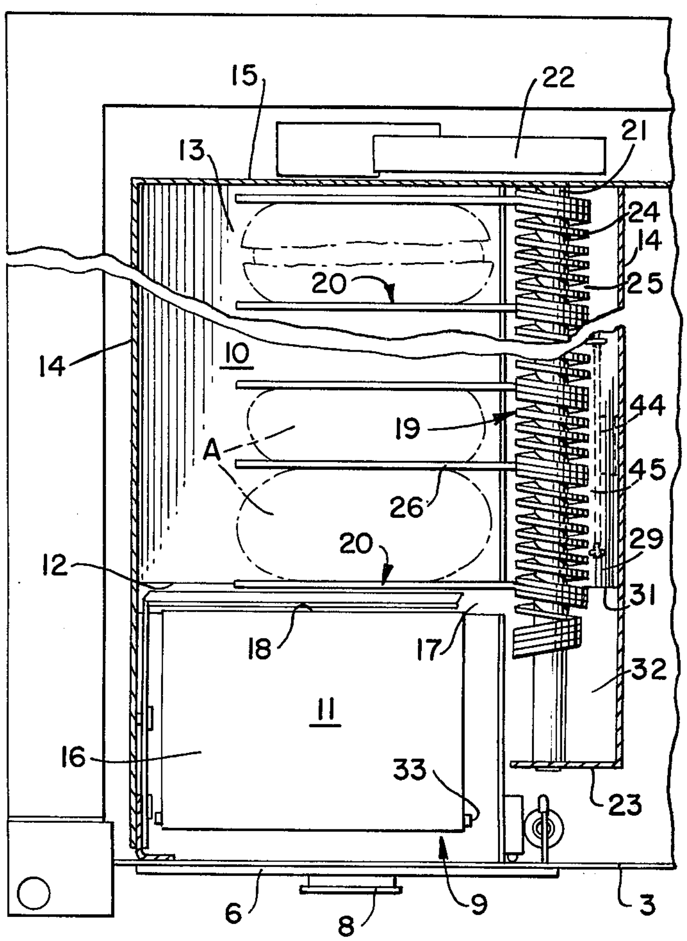
FIG. 2 is a fragmentary plan view, partly in section, illustrating one of the storage-delivery cells of the present invention.
Figure 3:
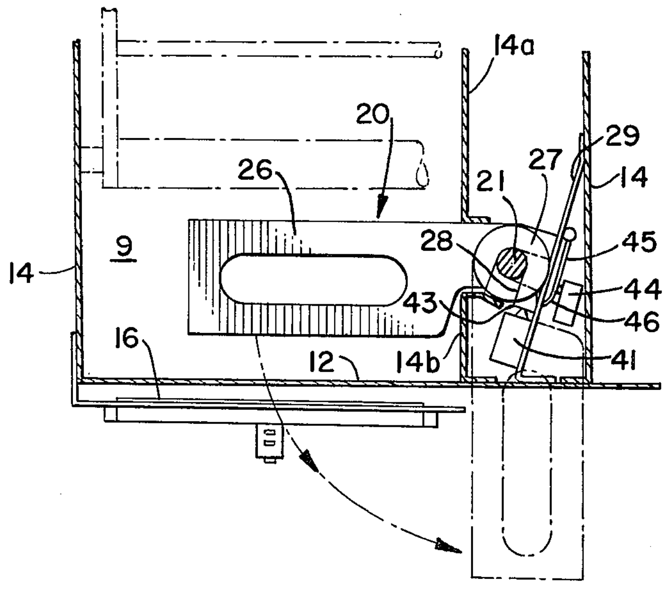
FIG. 3 is a front elevation, partly in section, of the storage-delivery cell of FIG. 2.
Figure 4:
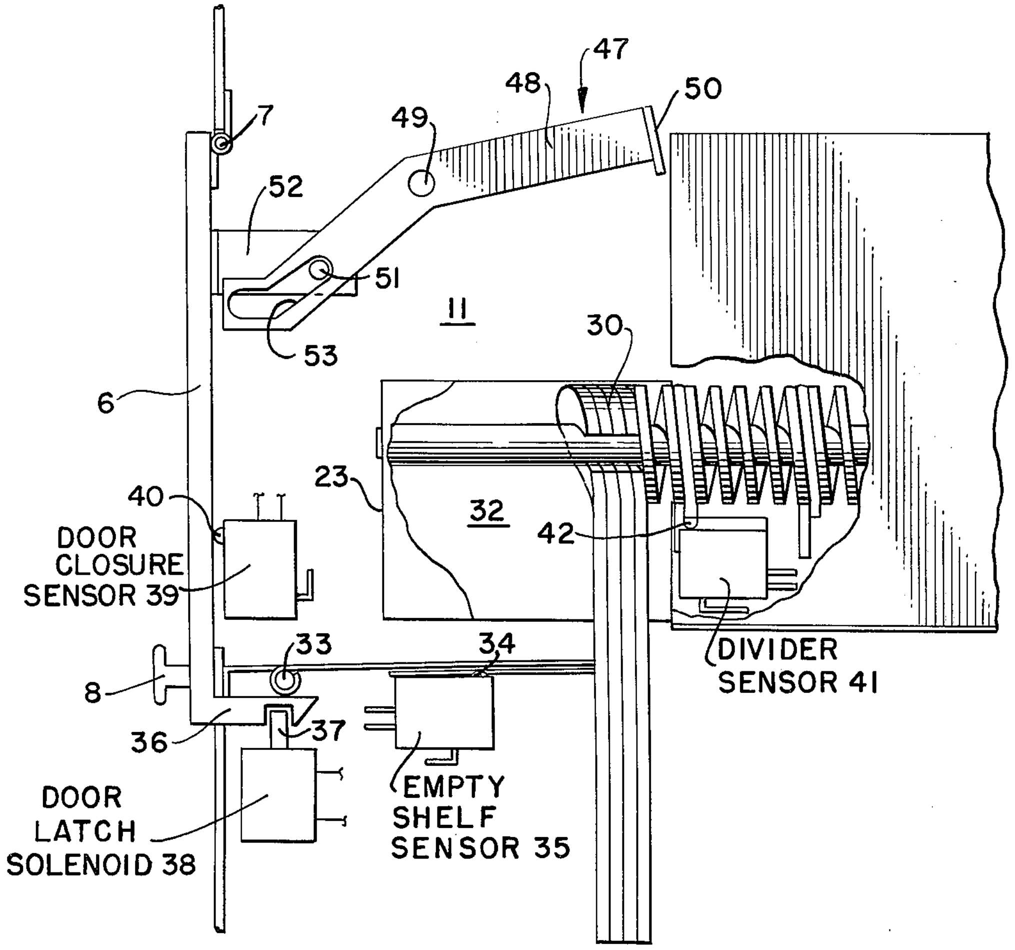
FIG. 4 is a fragmentary side elevation, greatly enlarged, of the structure of FIG. 2.

Means for advancing articles A located at any point within the depth of each storage compartment 10 to the forward edge 12 of its shelf 13 and subsequently into the delivery compartment 11 are provided in the form of a feeder assembly, generally designated 19 and which is shown in FIGS. 2–4. In its broadest aspects, the feeder assembly 19 comprises an elongated element having a helical periphery such that upon rotation thereof the convolutions of the element forming the helix are sequentially advanced in order to concurrently advance a plurality of divider members 20 extending into the storage compartment 10 whereby any packaged article A disposed in front of any one divider 20 is thus advanced a corresponding distance adjacent to the displacement of its adjacent divider member.

The feeder assembly 19 preferably comprises a longitudinal rod or shaft 21 adapted to be driven in a rotary manner by suitable drive means such as the motor 22 disposed rearwardly of the rear wall 15 and which is regulated by means of a unique combination of switch means to be described hereinafter. The opposite end of the rod 21 extends forwardly beyond the storage shelf 13 and is suitably journaled within the front flange 23 projecting inwardly from the adjacent sidewall 14 as shown most clearly in FIG. 2 of the drawings. The periphery of the rod 21 is provided with continuous helical flange 24 extending from a point adjacent the rear wall 15 of the compartment to a point just past the vertical plane of the forward edge 12 of the storage shelf 13 and thus will be seen to provide a plurality of equi-spaced convolutions providing a corresponding number of equi-spaced clearances 25 between each adjacent pair of convolutions. It is these clearances which provide mating means for the removable attachment of one or more divider members 20 as shown in FIGS. 2–4 wherein it will be seen that each divider member includesa main body 26 adapted to be disposed above the plane of the storage shelf 13 and which is connected to a drive head 27 at one end thereof having a hook configuration and which is insertable between any two adjacent convolutions of the feeder assembly flange 24 with the slot 28 of the divider drive head straddling the feeder assembly rod 21.

The main body 26 of each divider member is retained in the horizontal position as shown in FIG. 3 of the drawings by means of an inclined divider support plate 29 which will be understood to be fixedly mounted adjacent the feeder assembly and provides an abutment for the outer or support edge 30 of the divider member drive head 27 such that the divider member is retained in the use position in a cantilever manner. With the foregoing structure in mind, it will be apparent that upon actuation of the drive motor 22 the feeder assembly 19 will be driven in a rotary manner to advance the convolutions as formed by the flange 24 thereof in a direction from the rear wall 15 of the cell 9 toward the forwardmost limit of the flange 24, carrying with it all of the divider members 20 supported thereby. Quite obviously other means may be used to retain the divider members in a horizontal manner while in the storage area such as a downwardly extending foot (not shown) on the body of each member which would rest upon the shelf 13.

The above advancement will continue until the drive motor 22 is de-activated or, the drive head 27 of any one divider member is advanced past the forward edge 31 of the inclined divider support plate 29, at which point it will be seen that the support edge 30 of the divider member will no longer engage any abutment means and the weight of the main body 26 of the divider member will cause the divider member to pivot about the feeder assembly rod 21 from the horizontal position shown in full lines in FIG. 3 to the dotted line position thereof. As the divider members transition from the horizontal to the suspended position the main body 26 thereof passes through the clearance 17 between the storage shelf 13 and delivery shelf 16 and eventually all dividers carried by any one feeder assembly will accumulate within the divider member storage area 32 as shown in FIGS. 2 and 4, whereupon when the storage-delivery cell 9 is empty of any packaged articles A and it is desired to restock the apparatus it is but a simple matter to retrieve all of the accumulated divider members 20 within the storage area 32 and to reattach them to the feeder assembly 19 in the properly spaced apart manner according to the dimensions of the packaged articles A loaded into the cell 9.

Interference between the packaged articles A and the feeder assembly 19 is prevented by the provision of a vertical wall serving to partially enclose the feeder assembly and shielding it from dirt and view of the customer. This wall comprises upper and lower sections **14*a* and 14*b* having their opposed edges spaced apart to provide clearance for the passage of the divider members 20 from the rear of the storage compartment 10 to the front thereof. by pivotally or removably mounting the upper section 14*a***, the attachment of the divider members to the feeder rod is facilitated.

In the embodiment as illustrated in FIGS. 2 and 4 the delivery shelf 16 is movably attached to the balance of the apparatus such as by the pivot pin 33 and is normally maintained in a raised position by means of a spring loaded switch actuating finger 34 forming a part of the empty shelf sensor switch 35.

Each door or window 6 is retained in the locked position by means of a latch 36 carried thereby and extending into the confines of the cabinet 2 to be retained by the bolt 37 projecting from the door latch solenoid 38. The disposition of the door 6 is identified at any time by means of a door closure sensor 39 having a switch actuating finger 40 adapted to be depressed when the door is in the closed and locked condition as shown in FIG. 4 of the drawings. Additional switch means in the form of a divider sensor 41 is carried by the inclined divider support plate 29 and includes a switch actuating finger 42 disposed adjacent the forward edge 31 of the inclined divider support plate in a manner to be engaged by the foot 43 of each divider member drive head 27 at that time when the main body 26 of the divider member is located immediately adjacent the forward edge or discharge point 12 of the storage shelf 13 as shown most clearly in FIGS. 2 and 4 of the drawings.

The operation of the above described apparatus may now be considered. In the stocked condition it will be understood that a plurality of packaged articles A are located within each storage compartment 10 with a divider member 20 positioned immediately to the rear of each packaged article in addition to another divider member 20 immediately forward of the forwardmost packaged article situated within the storage compartment. Additionally, there is a packaged article resting upon the delivery shelf 16 within the delivery compartment 11 and which will be readily viewable through the adjacent door or window 6.

Figure 5:
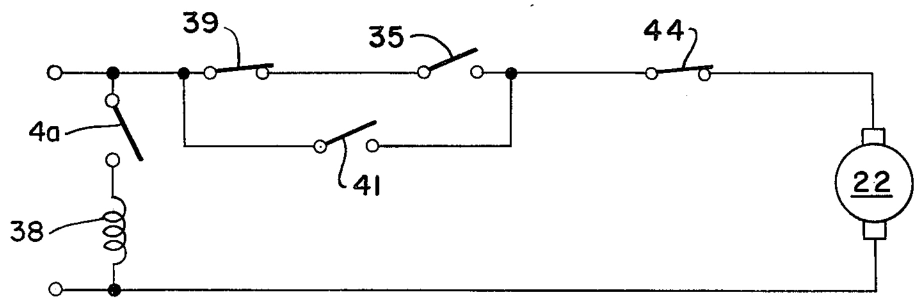
FIG. 5 is a circuit diagram applicable to the switch means shown in FIGS. 2–4.

Upon depositing the proper coin(s) in the slot 4 the customer is able to withdraw one door latch 36 against the action of its respective solenoid 38 so that the door 6 may be opened against the spring loading of its hinge 7 to permit withdrawal of the packaged article A disposed immediately behind the door 6 upon the delivery shelf 16. This removal of the packaged article causes the delivery shelf 16 to become elevated by the spring loaded switch actuating finger 34, thereby closing the sensor switch 35. At this point the line circuit to the drive motor 22 is still open as the window or door 6 has not yet been closed and its sensor 39 is still in the opened condition. Upon closing of the door 6 and reengaging latch 36 with the solenoid bolt 37 the door closure sensor 39 will be closed and this closure, coupled with the closure of the sensor switch 35 as previously described, will be understood to complete the line circuit to the drive motor 22 as will be understood when considering the diagram of FIG. 5 of the drawings.

With the drive motor operating, the feeder assembly will rotate to concurrently advance all of the divider members 20 attached thereto and progressively simultaneously advance each packaged article located in front of a divider member. Initially, when the motor begins to operate it will follow that the forwardmost divider member heretofore located immediately adjacent the forward edge or discharge point 12 of the storage shelf 13 will be advanced a slight distance such that its foot 43 will release the switch actuating finger 42 of the divider sensor 41 substantially at the same time as the support edge 30 of its drive head clears the forward edge 31 of the inclined divider support plate 29. Two actions occur when this happens. When the support edge 30 leaves its abutment with the inclined divider support plate the divider member 20 will swing from its horizontal position to its suspended position, passing through the clearance 17 and into the divider member storage area 32 and at the same time, the switch actuating finger 42 is permitted to move into the extended position, thereby closing the divider sensor switch 41 so that at this stage the three switches 35, 39 and 41 are all closed. Continued operation of the drive motor 22 will cause the most forwardmost divider member to push the packaged article A immediately in front thereof until it clears the forward edge 12 of its supporting shelf 13 and falls upon the delivery shelf 16 of the delivery compartment 11, at which time the mass of the packaged article thereupon depresses the switch actuating finger 34 thereby opening the switch 35. The motor 22 continues to operate since the switch 41 is still closed, but when the forwardmost divider member which has just pushed the packaged article into the delivery compartment reaches a point adjacent the forward edge 12 of the shelf 13 it will be seen that the foot 43 of this divider member will depress the switch actuating finger 42 of the switch 41 to open this switch and thereby break the one remaining line circuit to the drive motor and cease its operation. The condition of the three switches 35, 39 and 41 at this time will appear as shown in the wiring diagram of FIG. 5 of the drawings.

Switch means are included to prevent continued operation of the feeder assembly 19 following transfer of the last packaged article in any one cell 9 to the delivery compartment 11 thereof. This switch means comprises a divider empty sensor switch 44 located beneath the inclined divider support plate 29 and includes a switch actuating finger normally depressed by a feeler plate 45 likewise located beneath the inclined divider support plate 29. This feeler plate 45 includes a finger 46 projecting through a slot in the support plate 29 into the plane traveled by the support edges 30 of the divider members carried by the feeder assembly 19 such that with the presence of at least one divider member 20 juxtaposed any portion of the feeler plate 46 it will be appreciated that the plate 45 is deflected into engagement with the switch actuating finger of the sensor switch 44 thereby closing this switch; however, when the last divider member 20 in any one storage compartment 10 has been advanced forwardly past the leadingmost edge of the finger 46, this finger is then free to move away from the sensor switch 44 thereby opening the switch and breaking the circuit to the drive motor 22. Thus it will be apparent that the finger 46 must be located far enough forward in the last article storage compartment 10 to ensure that when the last article has been pushed off the storage shelf 13 and onto the delivery shelf 16 the switch 44 will be opened, and not before any such time.

Mechanical means must be provided to prevent passage of an operator's hand past the area of the delivery compartment 11 so that unauthorized removal of packaged articles from the storage compartment 10 may be precluded. This may be accomplished by any of various means such as by the gate assembly illustrated in FIG. 4 and generally designated 47, and which may comprise a link 48 fixedly attached to the cabinet or housing by means of a medially disposed pivot 49 and which includes a transversely disposed cross bar 50 extending substantially the width of the storage-delivery cell 9. When the door or window 6 is closed the gate assembly 47 appears as in FIG. 4 wherein it will be seen that unobstructed viewing of the contents of the cell is permissible inasmuch as the link 48 is disposed to one side of the cell and is carried by the adjacent sidewall 14 thereof while the crossbar 50 is in the elevated position well above the upper limits of any packaged articles contained therebehind, but as the door 6 is opened the pin 51 projecting from a bracket 52 on the door traverses the cam slot 53 in the link 48 to lower the crossbar 50 to the dotted line position as shown in FIG. 3, thereby acting as a barrier to the remaining packaged articles therebehind.

Figure 6:
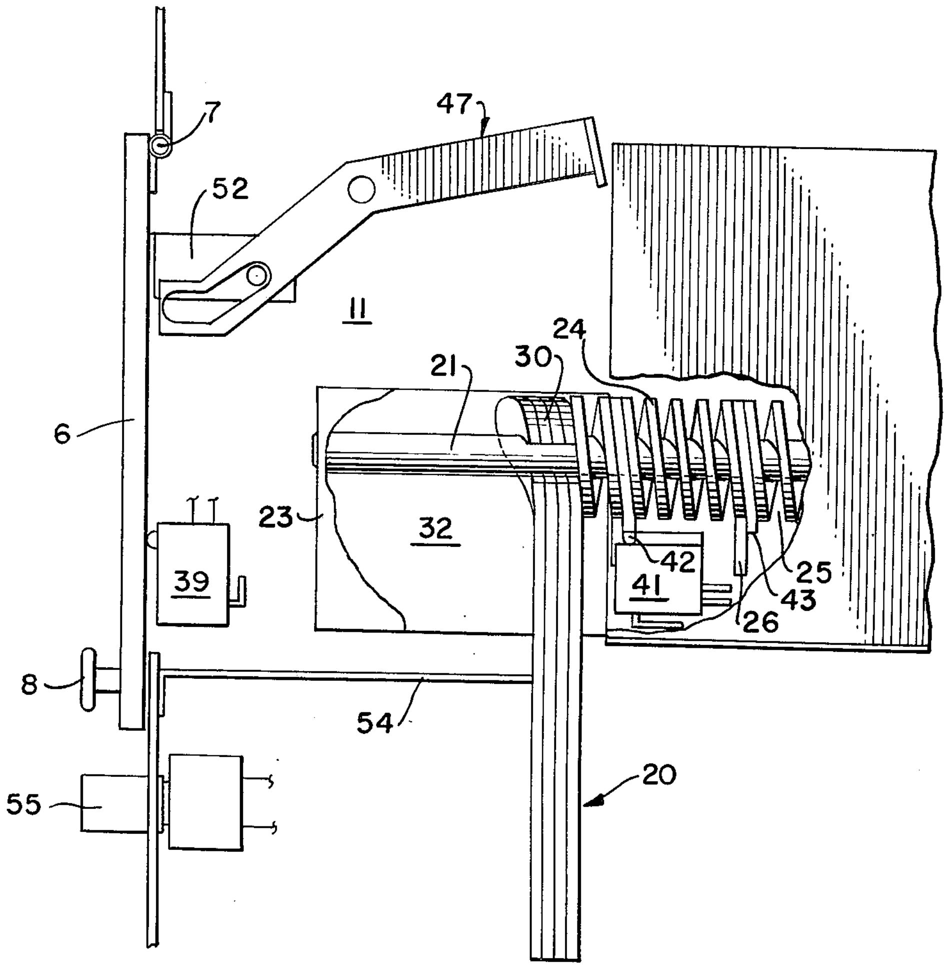
FIG. 6 is a view similar to FIG. 4 and illustrates a modification thereof.
Figure 7:
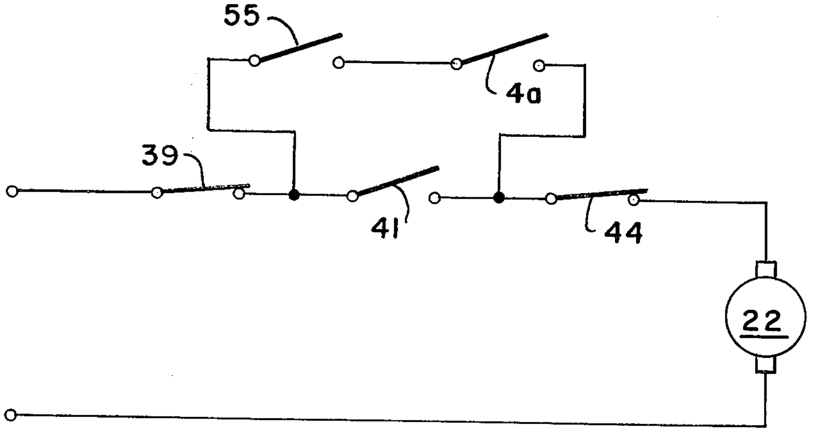
FIG. 7 is a circuit diagram applicable to the switch means as employed in the embodiment of FIG. 6.

In the embodiment illustrated in FIGS. 6 and 7 the article storage compartment and the feeder assembly 19 are identical to those as previously described herein. The significant difference in this embodiment is the elimination of a vertically displaceable delivery shelf by the substitution of a fixed delivery shelf 54. In this arrangement all of the packaged articles A on display within the cell 9 are normally retained in storage within the article storage compartment 12 and it is only after deposit of the proper coin(s) and actuation of a separate delivery actuation switch 55 that the feeder assembly 19 is activated and the forwardmost packaged article delivered to the fixed shelf 54 for subsequent retrieval by the customer. The same gate assembly 47 is employed to preclude unauthorized access to the packaged articles as disposed within the storage compartment 10 and from a review of the circuit diagram of FIG. 7 it will be apparent that the mere opening of any one of the doors 6 will be of no avail since the feeder assembly 19 cannot be actuated unless the proper coins have been deposited and after which time the delivery actuation switch 55 is depressed. The coin mechanism sensor switch 4*a* may be located in association with the coin slot 4 so that following deposit of the proper coin(s) and actuation of the desired delivery actuation switch 55 it will be seen that the line to the drive motor 22 will be completed and the feeder assembly 19 actuated. Depression of the delivery actuator switch 55 completes the above described circuitry long enough for the feeder assembly to advance the forwardmost divider member 20 past its engagement with the divider sensor switch 41 at which time this switch is closed and the motor continues to operate until such time as the next leading most divider member reaches the forward portion of the article storage compartment 10, engages the switch 41 and thereby breaks the circuit to halt operation of the drive motor 22. In this embodiment the door closure sensor switch 39 will be seen to be wired ahead of the bridge circuit (FIG. 7) and thus serves to ensure non-operation of the drive means whenever the door 6 is open.

Figure 8:
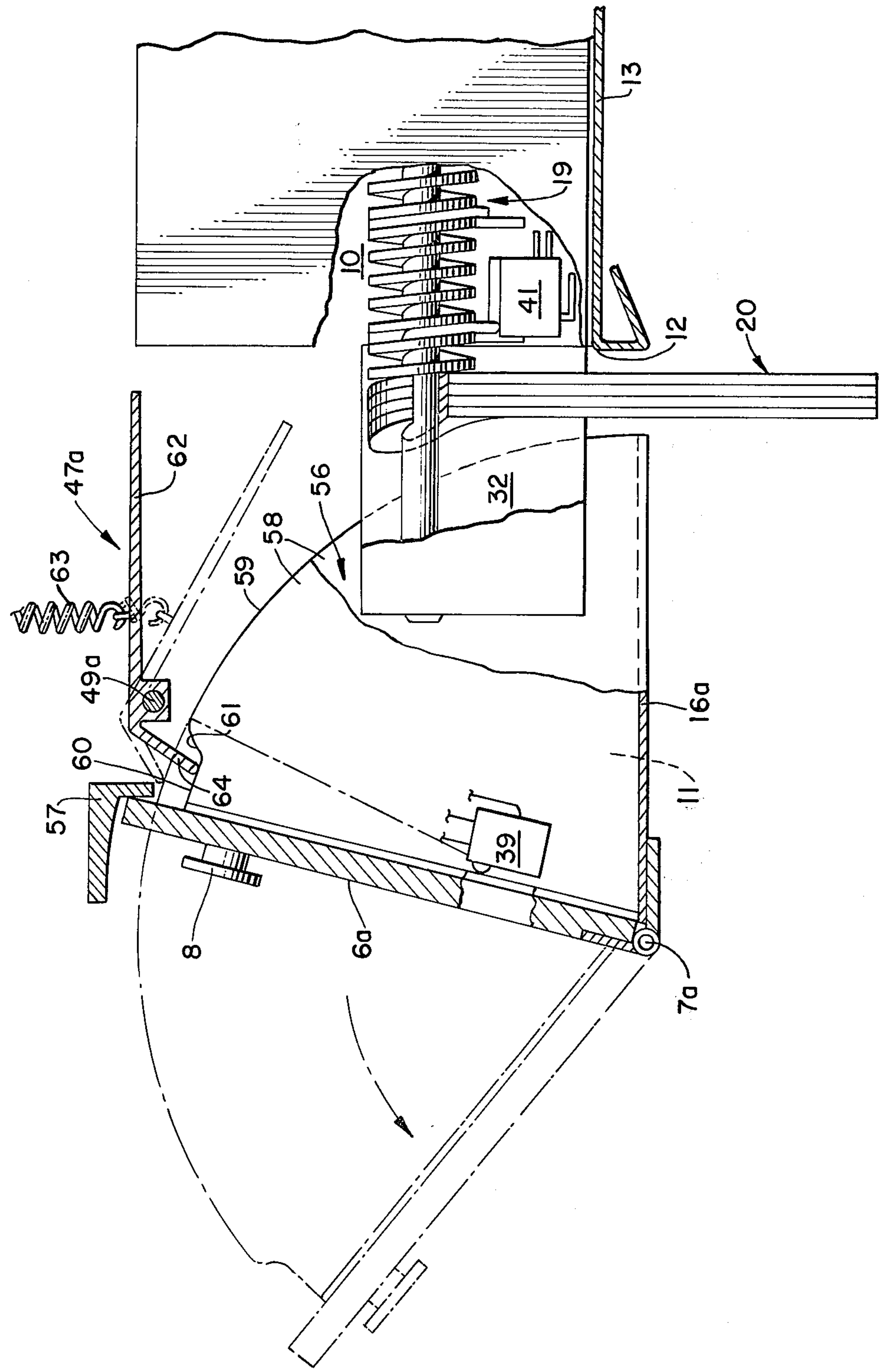
FIG. 8 is a view similar to FIGS. 4 and 6 and illustrates a further modification thereof.

In the further embodiment illustrated in FIG. 8, an alternative article access arrangemnt is shown which may be substituted for the access door 6 and fixed delivery shelf 54 as shown in the embodiment of FIG. 6. It will be understood that the same feeder assembly 19 as well as switch and circuit construction, as shown in FIGS. 6 and 7 is utilized with the modification of FIG. 8. In this latter modification, the using customer gains access to the delivered packaged article A by means of a trap chamber 56, comprising an access door 6i a which in this case is attached to the cabinet or housing 2 by means of a spring-loaded hinge 7*a* disposed along the bottom edge of the door 6*a.* A suitable transversely disposed and fixed door-stop 57 provides an abutment to retain the door 6*a* in the closed position as shown by full lines in FIG. 8 of the drawings. When in this closed position it will be seen that the delivery shelf 16*a,* which is fixedly attached with respect to the door 6*a,* is disposed in a substantially horizontal plane similar to the delivery shelves 16 and 54 previously described. The lateral limits of the trap chamber 56 are defined by a pair of pie-shaped sidewalls 58—58 each having an arcuate edge 59 joined respectively to the door 6*a* and delivery shelf 16*a.* The forward portion of one or both arcuate edges 59 will be seen to be modified justaposed the door 6*a* by a notch 60 having a rear-most ramp 61 communicating with the arcuate edge 59 for purposes which will become apparent here-in-after.

The operation of the trap chamber 56 should be quite obvious following consideration of the foregoing description. Following deposit of proper coin(s) and operation of the selected delivery actuation switch 55 associated with the delivery cell 9, the related feeder assembly 19 operates to transfer the forwardmost packaged article A from the storage compartment 10 onto the upper surface of the delivery shelf 16*a* after which the customer opens the door 6*a* by means of a knob 8 to pivot the trap chamber 56 about the hinge point 7*a* to displace the trap chamber to the broken line position whereupon the article may be readily removed therefrom prior to the trap chamber returning to the closed position.

As in the previously described embodiments, an appropriate gate assembly 47*a* is included to prevent customer access to packaged articles contained in the storage compartment 10 when the door 6*a* is opened. In this instance, the gate assembly 47*a* will be seen to comprise an arm 62 pivotally mounted adjacent its forward portion as at 49*a* and which is normally urged upwardly to the full line position of FIG. 8 by means of the spring 63. Depending downwardly and forwardly from the forward portion of the arm 62 is a finger 64 adapted to alternately engage the arcuate edge 59 and notched portion 60 of at least one of the sidewalls 58. From a review of the alternate positions of the trap chamber 56 it will be observed that when the chamber is in the full line or closed position the finger 64 of the gate assembly will be disposed within the notch 60 thus permitting the arm 62 to be spring-urged to its uppermost position well clear of the through passage connecting the storage compartment 10 with the delivery compartment 11, yet when the packaged article A has been transmitted into the trap chamber 56 and the chamber subsequently displaced to the open, dotted line position of FIG. 8 it will be seen that the finger 64 of the gate assembly will be cammed upwardly by means of the ramp 61, thereby displacing the arm 62 downwardly to form a barrier between the delivery compartment and the storage compartment. Quite obviously the finger 64 of the gate assembly 47*a* may engage but one of the two sidewalls 58 or, alternatively, extend transversely across the entire delivery compartment to simultaneously engage similar notches 60 and arcuate edges 59 on both of the sidewalls 58. Likewise, it will be apparent that the arm 62 may either extend to entire transverse dimension of the delivery compartment to serve as the sole barrier structure there across or may merely comprise a single narrow member mounted adjacent one side of the delivery compartment as in FIGS. 4 and 6 of the drawings, in which case an appropriate cross bar 50 will be attached to the rear most edge of the arm 62, as in the case of the gate assembly 47.

I claim:

1. An article vending apparatus including, a cabinet having an interior storage compartment and an adjacent delivery compartment defining a storage/delivery cell, said storage compartment provided with a shelf having a forward discharge point and adapted to support a plurality of adjacent articles behind said point, said delivery compartment provided with a shelf, said cabinet including a movable door providing access to said delivery compartment, a movable gate assembly within said delivery compartment displaceable upon opening of said door to preclude customer access into said storage compartment, feeder means adjacent said storage compartment including means overlying said storage compartment shelf for engaging and advancing all articles within said storage compartment from the rear thereof to said discharge point and subsequently pushing same onto said delivery compartment shelf, displacing means for shifting said engaging means from a position overlying said storage compartment shelf to an alternate storage position, and said gate assembly including a pivotally mounted link to one side of said cell, a crossbar at one end of said link disposed in the rear of said delivery compartment, cam means at the other forwrad end of said link, and means carried by said door engageable with said cam means to raise said crossbar when said door is closed and lower said crossbar when said door is opened.

2. An article vending apparatus according to claim 1 including, a plurality of said cells in said cabinet.

3. An article vending apparatus including, a cabinet having an interior storage compartment and an immediately adjacent delivery compartment defining a storage delivery cell, said storage compartment provided with a shelf having a forward discharge point and adapted to support a plurality of adjacent articles behind said point, said delivery compartment provided with a shelf having a rear edge juxtaposed said storage compartment discharge point and spaced therefrom to provide a minimal clearance therebetween, said cabinet including a movable door immediately adjacent said delivery compartment and providing access thereto, feeder means adjacent said storage compartment including a plurality of means overlying said storage compartment shelf for individually engaging and advancing all articles within said storage compartment from the rear thereof to said discharge point and subsequently pushing same onto said delivery compartment shelf, displacing means for individually shifting said engaging means from a position overlying said storage compartment shelf to an alternate storage position juxtaposed one another and laterlly of said delivery compartment shelf, and switch-actuated circuit means having a door closure sensor operable upon opening and closing of said movable door and regulating the actuation of said feeder means to advance the forwardmost article on said storage compartment shelf onto said delivery compartment shelf.

4. An article vending apparatus according to claim 3 wherein, said delivery compartment includes a movable gate assembly displaceable upon opening of said door to preclude customer access into said storage compartment.

5. An article vending apparatus according to claim 1 including switch-actuated circuit means having a door closure sensor operable upon opening and closing of said movable door and regulating the actuation of said feeder means to advance the forwardmost article on said storage compartment shelf onto said delivery compartment shelf.

6. An article vending apparatus according to claim 3 wherein, said feeder means includes a longitudinal rod extending from adjacent the rear of said storage compartment to adjacent said delivery compartment, said rod having a radially extending periphery defining a plurality of helical convolutions and intermediate helical clearances, said engaging means comprising divider members insertable transversely of said storage compartment and each having a drive head insertable within a selected one of said helical clearances and pivotable about said rod, said divider members each including a main body overlying said storage compartment shelf adjacent said drive head, means engaging said divider members when adjacent said storage compartment shelf to maintain said main body in overlying relationship thereto, and drive means including a switch-actuated circuit connected to said feeder means for rotating same and advancing said divider members and articles adjacent thereto from the rear of said storage compartment to said delivery compartment.

7. An article vending apparatus according to claim 1 wherein, said delivery compartment shelf includes a rear edge juxtaposed said storage compartment discharge point and spaced therefrom to provide a minimal clearance therebetween.

8. An article vending apparatus according to claim 3 wherein, said switch-actuated circuit means includes a sensor switch adjacent said delivery compartment shelf responsive to the presence or absence of an article thereupon, whereby the presence of an article on said delivery shelf opens said sensor switch to break a portion of said circuit.

9. An article vending apparatus according to claim 1 wherein, said cells when viewed from the front of said cabinet are horizontally and vertically aligned.

10. An article vending apparatus according to claim 3 including, a plurality of said cells in said cabinet.

11. An article vending apparatus according to claim 6 wherein, said divider member engaging means includes a fixedly disposed support plate, and said divider member drive head is provided with a support edge juxtaposed said support plate.

12. An article vending apparatus according to claim 6 wherein, said switch-actuated circuit means includes a product selection switch operable by a customer to close a portion of the circuit including said drive means.

13. An article vending apparatus according to claim 8 wherein, said delivery shelf is pivotally mounted for movement from an elevated to a depressed position dependent upon the absence or presence of an article thereon, respectively.

14. An article vending apparatus according to claim 8 including, an electrically actuated latch engaging said door and operable to unlock said door upon the insertion of proper coins in said apparatus.

15. An article vending apparatus according to claim 11 wherein, said discharge point and the rear of said delivery compartment shelf are spaced apart to provide a minimal clearance therebetween, said support plate terminating in a forward edge adjacent said discharge point whereby, when any one of said divider member passes said discharge point said support edge clears said support plate and said drive head pivots about said rod as said main body swings downwardly through said minimal clearance.

16. An article vending apparatus according to claim 11 wherein, said support plate includes a forward edge adjacent said discharge point, a feeler plate adjacent said support plate having a longitudinal finger engageable by passing drive heads carried by said feeder assembly, said switch actuated circuit means including a divider empty sensor switch actuated by said feeler plate in the presence of one said drive head to close a portion of said circuit, and the forwardmost edge of said finger terminating short of said discharge point whereby upon the advancement of the last one of said divider members past said finger said circuit is opened.

17. An article vending apparatus according to claim 11 wherein, said convolutions terminate adjacent said discharge point and said rod extends forwardly therebeyond to define a divider member storage area wherein said downwardly disposed divider members accumulate after passing through said minimal clearance.

18. An article vending apparatus according to claim 16 wherein, said switch actuated circuit means further includes a divider sensor switch disposed adjacent said support plate forward edge and engageable by said divided member drive head when said main body is adjacent said discharge point to open said circuit.

19. An article vending apparatus including, a cabinet having an interior storage compartment and an adjacent delivery compartment defining a storage/delivery cell, said storage compartment provided with a shelf having a forward discharge point and adapted to support a plurality of adjacent articles behind said point, said delivery compartment provided with a shelf, said cabinet including a movable door providing access to said delivery compartment, feeder means adjacent said storage compartment including means overlying said shelf for engaging and advancing all articles within said storage compartment from the rear thereof to said discharge point and subsequently pushing same onto said delivery compartment shelf, displaying means for shifting said engaging means from a position overlying said storage compartment shelf to an alternate storage position, said delivery shelf and door connected to each other to provide a trap chamber, means pivotally attaching said trap chamber relative said cabinet to permit displacement thereof between alternate closed and open positions whereby, when said trap chamber is in said closed position said door is closed and said delivery shelf is disposed substantially horizontal adjacent said discharge point and when displaced to said open position said door is open and said delivery shelf is inclined upwardly from said pivotal attaching means.

20. An article vending apparatus according to claim 19 including, a pair of sidewalls joining said door and delivery shelf and defining the lateral limits of said trap chamber, and a movable gate assembly displaceable upon opening of said door to preclude customer access through said trap chamber into said storage compartment.

21. An article vending apparatus according to claim 20 wherein, said gate assembly includes a pivotally mounted arm overlying said delivery compartment, spring means normally urging said arm into a raised position above said delivery compartment, and means on said arm engageable by said sidewalls to displace said arm downwardly when said door is opened.

* * * * *